Patented Dec. 12, 1933

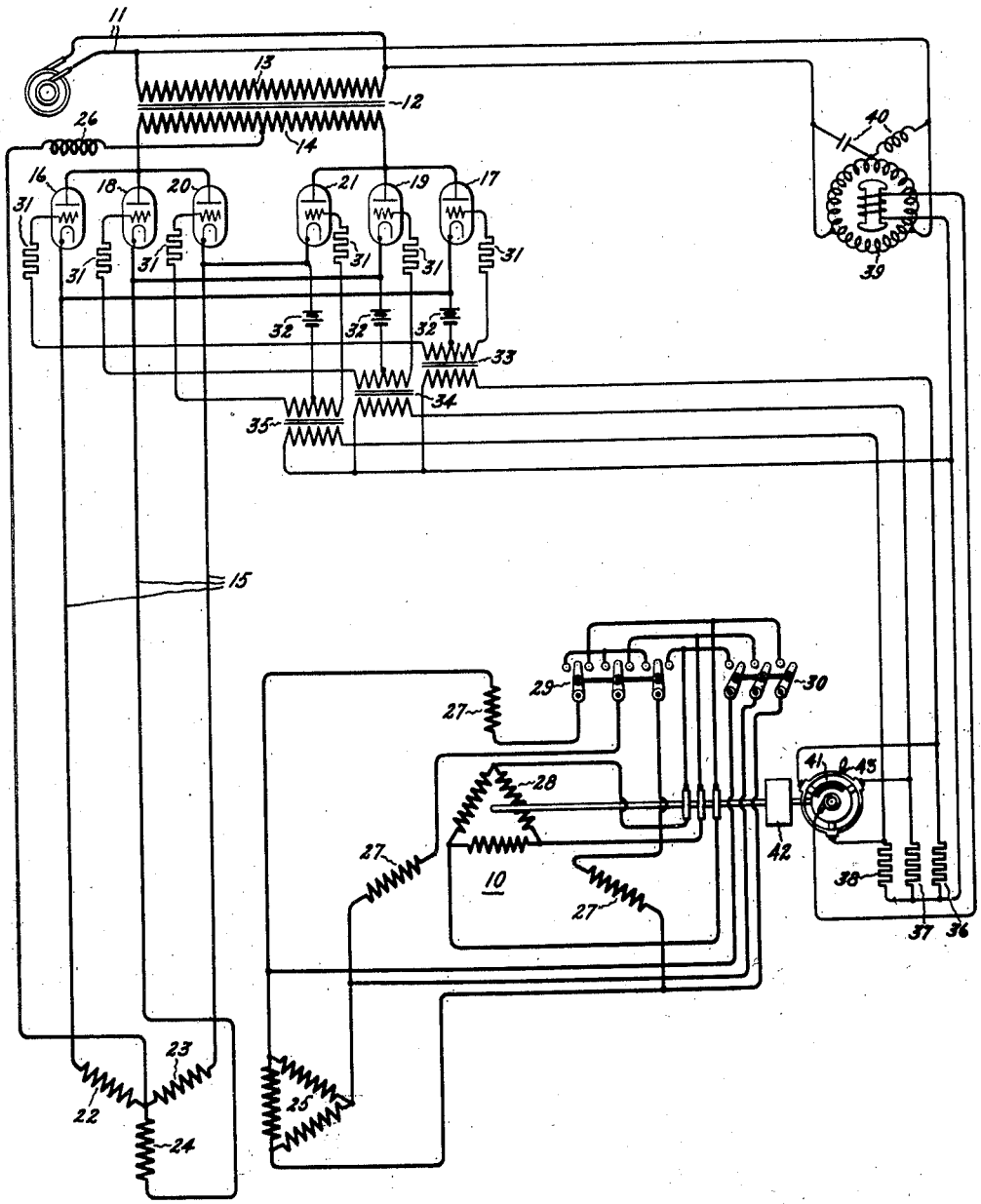
Inventor:
Burnice D. Bedford,
by Charles E. Tullar
His Attorney.

1,939,432

UNITED STATES PATENT OFFICE 1,939,432

ALTERNATING CURRENT MOTOR SYSTEM

Burnice D. Bedford, Schenectady, N. Y., assignor to General Electric Company, a corporation of New York Application August 31, 1932. Serial No. 631,228

8 Claims. (Cl. 172—120)

My invention relates to alternating current motor systems and more particularly to such systems adapted to operate an alternating current motor at variable speed from an alternating current supply circuit of fixed frequency.

Heretofore, there have been proposed several arrangements for operating an alternating current motor at variable speed from a source of alternating current of fixed frequency. The use of vapor electric discharge valves in arrangements of this type has been found particularly satisfactory because of the relatively large amounts of energy which may be handled at ordinary operating voltages. The use of this type of valve, however, involves certain difficulties in commutating the current between the several electric valves since, as is well known in the art, the grid of such a valve is incapable of interrupting the current in a valve when it is desired to transfer the current from this valve to another valve; that is, commutation cannot be effected by the grid control circuit. In certain of the arrangements of the prior art this commutation of current between the several electric valves has been effected by what is known as rectifier commutation; that is, the current in a valve is interrupted when the alternating supply voltage passes through zero and is prevented from restarting in the valve by means of the grid control circuit. At the same time, another valve to which it is desired to commutate current is excited to conduct the current which has ceased flowing in the first valve. It has been found, however, that with this type of commutation, it is possible to obtain completely satisfactory operation of the motor only up to approximately half synchronous speed, while in many instances it is desirable that the motor should operate up to and beyond synchronous speed.

It is an object of my invention, therefore, to provide an improved alternating current motor system for operating an alternating current motor at variable speed from an alternating current circuit of fixed frequency which will overcome the above mentioned disadvantages of the arrangements of the prior art and which will be simple and reliable in operation.

It is another object of my invention to provide an improved alternating current motor system for operating an alternating current motor at variable speed from an alternating current supply circuit of fixed frequency, by means of which the motor may be operated satisfactorily up to and above synchronous speed.

In accordance with my invention, an alternating current motor is energized from an alternating current circuit of fixed frequency through an electric valve converting apparatus for reducing the frequency of the supply circuit. The connections are such that the rotor and stator windings of the motor are excited from the converting apparatus with an opposite phase rotation. With such an arrangement, the motor will operate at synchronous speed when the valve converting apparatus supplies half the frequency of the supply circuit. The rotor and stator windings of the motor may be connected in either parallel or in series, depending upon the speed torque characteristics desired. In addition, the speed torque characteristics may be varied by phase controlling the valve converting apparatus at the frequency of the supply circuit or by shifting the brushes of the grid commutator, or both.

For a better understanding of my invention, together with other and further objects thereof, reference is had to the following description taken in connection with the accompanying drawing and its scope will be pointed out in the appended claims. The single figure of the drawing illustrates an arrangement embodying my invention for operating a three phase wound rotor induction motor at variable speed from a single phase alternating current supply circuit.

Referring now more particularly to the drawing, there is illustrated an arrangement for operating at variable frequency a three phase wound rotor induction motor 10 from a single phase alternating current supply circuit 11 of constant frequency. This arrangement includes an electric valve converting apparatus or frequency changer comprising a transformer 12 provided with a primary winding 13 connected to the circuit 11, and with a secondary winding 14, the terminals of which are connected to the several phases of the alternating current circuit 15 through the pairs of electric valves 16 and 17, 18 and 19, and 20 and 21, respectively. Each of the several electric valves 16-21, inc., is provided with an anode, a cathode and a control grid, and is preferably of the vapor electric discharge type in which the starting of current in a valve is determined by the potential on its control grid but in which the current can be interrupted in the valve only by reducing its anode potential below the critical value. The alternating current circuit 15 is connected to the several phase windings 22, 23 and 24 comprising the primary network of a transformer, the secondary network 25 of which is connected to the motor 10, as described in more detail hereinafter. The electrical neutral of the primary network 22, 23, 24 is connected with the electrical neutral of the winding 14 through a smoothing reactor 26 in case half wave operation is desired, although it will be well understood by those skilled in the art that another group of valves similar to the electric valves 16–21, inc., but oppositely connected, may interconnect the networks 22, 23 and 24 with the network 14, in case full wave operation is desired. The connections between the secondary network 25 of the polyphase transformer and the stator winding 27 and the rotor winding 28 of the motor 10 are such as to energize the rotor and stator windings of the motor 10 with an opposite phase rotation. The stator winding 27 and rotor winding 28 may be connected for either parallel or series relation by means of the switches 29 and 30.

In order to control the amount of energy transmitted to the motor 10 from the circuit 11, the grids of the pairs of valves 16 and 17, 18 and 19, and 20 and 21, are connected to their common cathode circuit through current limiting resistors 31, negative bias batteries 32 and opposite halves of the secondary windings of the grid transformers 33, 34 and 35, respectively. The primary windings of the grid transformers 33, 34 and 35 are energized with potentials across the resistors 36, 37 and 38, respectively, which in turn, are supplied with an alternating potential variable in phase with respect to that of the circuit 11 from the secondary winding of a rotary phase shifting transformer 39, the primary winding of which is connected to the circuit 11 through a phase splitting arrangement 40. The grid transformers 33, 34 and 35 are selectively energized by means of a distributor 41 connected to the shaft of the motor 10 through a gear box 42 and arranged successively to complete the energizing circuit for the resistors 36, 37 and 38. In some cases also it may be desirable to provide a brush shifting mechanism 43 to vary the speed-torque characteristics of the motor. However, this feature of controlling the conductivity of a group of electric valves by a distributor mechanism driven by a motor energized through the valves forms no part of my present invention, but is disclosed and broadly claimed in a copending application of E. F. W. Alexanderson, Serial No. 638,361, filed May 11, 1923, and assigned to the same assignee as the present application.

The general principles of operation of the above described electric valve frequency changing apparatus per se will be well understood by those skilled in the art. In brief, if the alternating potential supplied by the rotary phase shifting transformer 39 is approximately in phase with that of the circuit 11, the distributor 41 will selectively energize the primary windings of the grid transformers 33, 34 and 35 for 120 electrical degrees referred to the frequency of the circuit 15, which in turn, will render conductive their associated pairs of valves 16 and 17, 18 and 19, and 20 and 21, respectively. It will be noted that each of these pairs of valves, together with the winding 14, comprises a rectifier circuit in which one of the phase windings 22, 23 or 24 is the load circuit. Thus each of the windings 22, 23 and 24 is successively energized with unidirectional current and a polyphase alternating current is generated in the secondary network 25 of the transformer. In order to start the motor 10, the rotary phase shifting transformer 38 may be operated to retard the phase of the alternating potential supplied to the grids of the valves 16–21, inc., and thus reduce the average unidirectional current in the several phase windings 22, 23 and 24 to supply a reduced voltage to the motor 10. The stator winding 27 and rotor winding 28 may be connected in parallel by operating switch 29 to its left hand position and switch 30 to its closed position, or to provide low voltage starting, the rotor and stator windings may be connected in series by opening the switch 30 and operating the switch 29 to its right hand position. As stated above, the connections are such that the phase rotation of the field produced by the stator winding is opposite from that produced by the rotor winding so that the speed of the motor 10 will be twice the synchronous speed corresponding to the frequency supplied by the valve converting apparatus to the circuit 15. Under the starting conditions assumed, however, the initial frequency will be zero and the motor will start up in a manner similar to a direct current motor. As the motor rotates, the distributor 41 is rotated to commutate the current between the several phase windings 22, 23 and 24 at a frequency varying in accordance with the speed of the motor and dependent upon the ratio of the gear box 42, which in turn, is dependent upon the number of motor poles. Thus, as the motor accelerates the supplied frequency is also increased to a value dependent only upon the connected load. Under these conditions the motor does not retain its induction motor characteristics, but at all times operates as a synchronous motor at double synchronous speed corresponding to the frequency of the circuit 15, which is automatically varied in response to the load requirements of the motor. The energy supplied to the motor may be increased, as is well understood by those skilled in the art, by advancing the phase of the grid potentials of the valves 16–21, inc., by means of the rotary phase shifting transformer 38, the maximum energy being delivered when the grid potentials are substantially in phase with the potential of the alternating current circuit 11. The speed torque characteristics of the motor may also be changed if desired, by shifting the brushes of the distributor 41 by means of the mechanism 43, which is effective to vary the relation between the magnetomotive forces of the stator winding 27 and that of the rotor winding 28.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is,—

1. In combination, an alternating current supply circuit, an alternating current motor provided with rotor and stator windings, an electric valve converting apparatus for reducing the frequency of the supply current, connections for exciting said rotor and stator windings from said converting apparatus with opposite phase rotation, and means for varying the frequency of the output of said converting apparatus to vary the speed of the motor.

2. In combination, an alternating current supply circuit, an alternating current motor provided with rotor and stator windings, an electric valve converting apparatus for reducing the frequency of the supply current, connections for exciting said rotor and stator windings from said converting apparatus with opposite phase rotation, switching means for selectively connecting said rotor and stator windings in series or parallel relation, and means for varying the frequency of the output of said converting apparatus to vary the speed of the motor.

3. In combination, an alternating current supply circuit, an alternating current motor provided with rotor and stator windings, an electric valve converting apparatus for reducing the frequency of the supply current, connections for exciting said rotor and stator windings from said converting apparatus with opposite phase rotation, and means responsive to the speed of said motor for controlling the frequency of the output of said valve converting apparatus.

4. In combination, an alternating current supply circuit, an alternating current motor provided with rotor and stator windings, an electric valve converting apparatus energized from said supply circuit, connections for exciting said rotor and stator windings from said converting apparatus with opposite phase rotation, means for controlling the excitation of said converting apparatus to control the energy supplied to said motor, and means driven by said motor for controlling the frequency of the output of said converting apparatus.

5. In combination, an alternating current supply circuit, an induction motor provided with rotor and stator windings, an electric valve converting apparatus energized from said supply circuit, connections for exciting said rotor and stator windings from said converting apparatus with opposite phase rotation, means for exciting said converting apparatus with an alternating potential of the frequency of the supply circuit and variable in phase with respect to the potential thereof to control the energy transmitted to said motor, and commutator means driven by said motor for controlling said excitation means to vary the output frequency of said converting apparatus in accordance with the speed of said motor.

6. In combination, an alternating current supply circuit, an alternating current motor of the wound rotor induction type provided with rotor and stator windings, and means for selectively energizing said rotor and stator windings from said source in series or parallel connection.

7. In combination, an alternating current supply circuit, an alternating current motor of the wound rotor induction type provided with rotor and stator windings, means for connecting said windings to said circuit in series relation to provide low voltage starting connections, and means for connecting said windings to said circuit in parallel relation under normal operating conditions.

8. In combination, a polyphase alternating current supply circuit, a polyphase alternating current motor provided with rotor and stator windings, means for energizing said windings from said source with an opposite phase rotation, and means for selectively changing the connections of said rotor and stator to series or parallel.

BURNICE D. BEDFORD.